United States Patent [19]

Dubé

[11] Patent Number: 5,061,055
[45] Date of Patent: Oct. 29, 1991

[54] BEDSIDE TELEVISION VIEWER

[76] Inventor: Lyne Dubé, 75 Hallowell, Montréal Québec, Canada, H3Z 2E8

[21] Appl. No.: 558,508

[22] Filed: Jul. 27, 1990

[51] Int. Cl.⁵ .................. G02B 5/08; G02B 7/198; F21V 7/05
[52] U.S. Cl. .................. 359/862; 359/857; 362/282; 362/360; 362/346
[58] Field of Search ............ 350/618, 623, 612, 624; 362/282, 360, 346, 341, 297, 298, 301, 413

[56] References Cited

U.S. PATENT DOCUMENTS

| 41,547 | 2/1864 | Stratton | 362/341 |
|---|---|---|---|
| 1,759,720 | 5/1930 | Stitzer | 362/297 |
| 1,799,849 | 4/1931 | Heile | 362/341 |
| 3,019,689 | 2/1962 | Paulsrud | 350/618 |
| 3,276,731 | 10/1966 | Orchard | 350/623 |
| 4,213,172 | 7/1980 | Scattolin et al. | 362/413 |
| 4,531,813 | 7/1985 | Van den Berg | 350/623 |

FOREIGN PATENT DOCUMENTS

| 81690 | 7/1919 | Fed. Rep. of Germany | 362/360 |
|---|---|---|---|
| 784234 | 7/1935 | France | 362/341 |
| 20795 | of 1912 | United Kingdom | 362/282 |
| 567520 | 2/1945 | United Kingdom | 350/623 |

OTHER PUBLICATIONS

Roy Doty et al., "Wordless Workshop", *Popular Science*, May, 1963, pp. 114-115.

*Primary Examiner*—Jon W. Henry
*Attorney, Agent, or Firm*—Pierre Lespérance

[57] ABSTRACT

The viewer is designed to look at a television screen located at the foot of a bed while lying back down on the bed and looking upward to the viewer. The latter comprises a pair of mutually-facing flat mirrors supported by a frame in spaced-apart relationship, the mirrors diverging downwardly. The frame is in the form of a casing opening downwardly, with a top wall provided with an opening surrounding the rim of a lamp shade, the frame being rotatably supported by the lamp shade. The base of the lamp is fixed to a stationary structure near the bed. The lamp is of the type in which the lamp shade can be adjustably positioned in space, so as to support the viewer in the proper position and at the proper angle with respect to the user and the television apparatus. The lamp can be used for reading or the like since the light bulb is exposed in the space between the two mirrors.

12 Claims, 6 Drawing Sheets

BEDSIDE TELEVISION VIEWER

FIELD OF THE INVENTION

The present invention relates to a light reflector and, more particularly, to such a reflector to be used as a bedside television viewer.

BACKGROUND OF THE INVENTION

A great number of persons are in the habit of watching television while lying in their bed The person generally takes a slouched position such as half-seated or with at least the head propped up by a pillow or the like, so as to be capable of viewing the television apparatus generally located at the foot of the bed. This slouched position is tiresome and can eventually produce backache.

It is therefore an object of the present invention to provide a bedside television viewer in the form of a light reflector, which enables a person to watch television while completely flat on her back in a most comfortable position.

Another object of the present invention is to provide a television viewer of the character described, which is supported by a fully-adjustable bedside lamp, the lamp being capable of being used by itself through the light reflector assembly for reading or the like when not watching television.

Another object of the present invention is the provision of a light reflector of the character described, which is of simple and inexpensive construction.

SUMMARY OF THE INVENTION

The bedside television viewer in accordance with the invention comprises a light reflector formed of a frame and of a pair of mutually-facing flat mirrors supported by the frame in spaced-apart relationship, the mirrors diverging widthwise of the same and substantially parallel to each other longitudinally of the same; and attaching means to attach the same to a support. In accordance with an important secondary feature of the invention, the support is in the form of a bedside lamp, the lamp shade of which containing the lamp socket being adjustably positioned in space, the light reflector being secured to the lamp shade with the lamp bulb carried by the lamp socket fully exposed within the space between the two mirrors. Therefore, the lamp can be used for its original purpose to illuminate the surrounding for reading or the like without having to remove the light reflector. Preferably, the diverging angle formed by the two mirrors is about 30 degrees. Preferably, the two mirrors are rectangular and have substantially equal length, one mirror having a greater width than the other mirror, said one mirror adapted to face the television screen. Preferably, the frame forms a rigid sheet assembly including a central flat portion and two end portions, each end portion carrying a mirror; the wider mirror being secured to an end portion which makes an angle of about 100 degrees with respect to the central portion and the other narrower mirror making an angle of about 110 degrees with respect to said central flat portion. The central flat portion preferably has a hole for receiving the lamp shade of the lamp. The frame is preferably fully rotatable with respect to the longitudinal axis of the lamp shade.

DETAILED DESCRIPTION OF THE PREFERRED EMBODIMENTS

Figure 1:
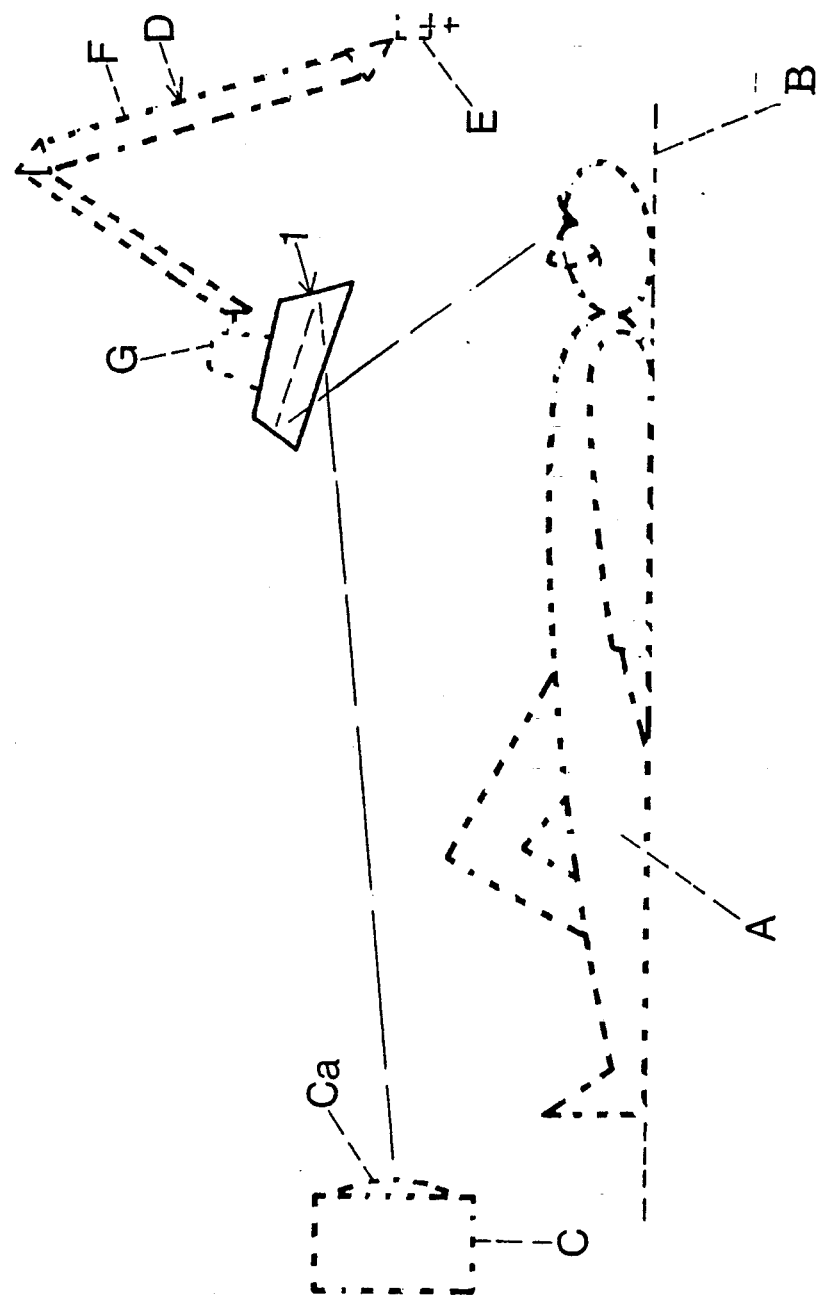
FIG. 1 is a schematic view showing a person looking at a television screen through the light reflector of the invention while lying on her back, the light reflector being supported by a conventional fully-adjustable bedside lamp.
Figure 2:
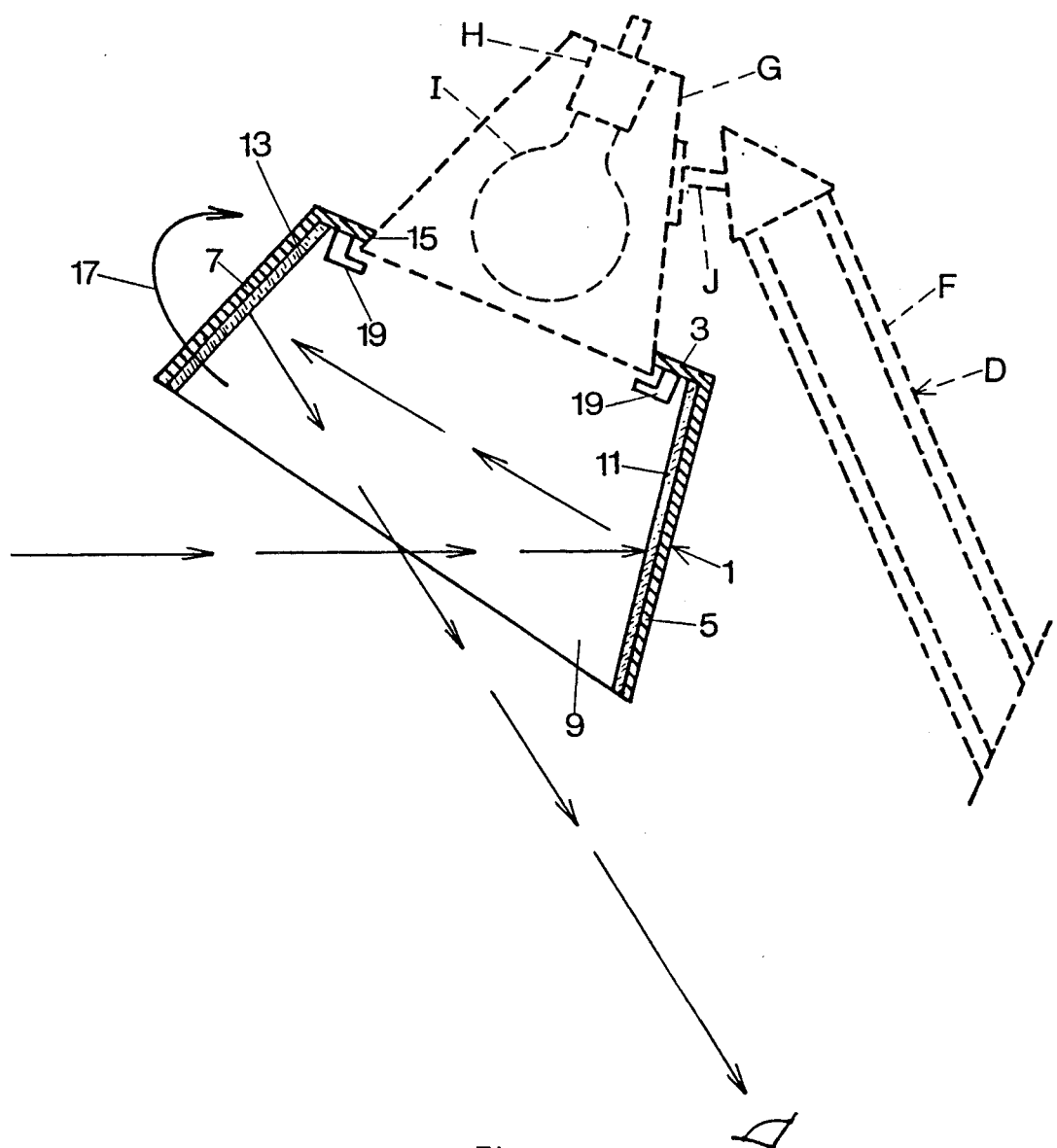
FIG. 2 is a vertical section of the light reflector as carried by the bedside lamp.

FIG. 1 shows a person A lying on her back on a bed B and looking through the light reflector 1 in accordance with the invention at the screen Ca of a television apparatus C, at the foot of a bed B. The light reflector 1 is adjustably positioned over the head of the person A, being supported by a conventional fully-adjustable lamp D, including a base E provided with means for attaching the same to a stationary structure, for instance a clamp for fixing the same to the bed head panel, or a base adapted to be fixed by screws or the like to an adjacent wall or to an adjacent horizontal surface. The lamp D includes an arm structure F, which is pivotable and can retain its pivoted orientation, the arm structure carrying at its outer end a lamp shade G to which the light reflector 1 is attached. In the embodiment shown, the lamp shade G (see more particularly FIG. 2) is of frusto-conical shape carrying a light bulb socket H at its smaller closed end and fully open at its larger bottom end. As usual, a light bulb I is screwed within socket H. The lamp D is of such construction that the light shade can be positioned anywhere in space within the reach of the arm structure F; and that the lamp shade can be adjustably oriented forwardly and backwardly as well as laterally; and can be pivoted about its lamp shade bracket J.

The light reflector 1 in accordance with the invention comprises a rigid sheet material bent to form a central flat section 3 and two end sections 5 and 7, which are also flat and which make more than a right angle with the central section 3. A pair of spaced and parallel, flat side walls 9 join and are fixed to the side edges of the sections 3, 5, and 7. Thus, a casing, opened at the bottom, is formed. A pair of rectangular shaped, flat, glass mirrors 11 and 13 are secured to the flat sections 5 and 7 respectively within the above-defined casing. The two mirrors are spaced from each other and are facing each other. The central flat section 3 is provided with a circular hole 15, centrally thereof. Hole 15 has a diameter slightly less than the bottom end of the lamp shade, so that it will be retained thereon while allowed to rotate with respect to the lamp shade in accordance with arrow 17. L-shaped retainers 19 are fixed to the underside of the central flat section 3, spacedly around circular hole 15 and they overlap the bottom edge of the lamp shade in order to prevent upward lifting of the light reflector 1 with respect to the lamp shade, while allowing their relative rotation.

The flat end section 5 of the casing, and the flat mirror 11 glued thereto are wider than the corresponding end section 7 and flat mirror 13 glued thereto. The two mirrors have substantially equal length. They are both rectangular with their length disposed normal to the side walls 9. The two mirrors diverge downwardly in a direction away from the light bulb socket H and make between themselves an angle of about 29 degrees. In a preferred embodiment, the angle between the wider mirror 11 and the central flat section 3 is about 100 degrees, while the angle between the narrower flat mirror 13 and the central flat section 3 is about 109 degrees.

In a preferred embodiment, each mirror has a length of about 5.1 inch, and the wider mirror 11 has a width of about 3.8 inch, while the narrower mirror 13 has a width of about 2.8 inch. Thus, mirror 11 is wider than mirror 13 by a ratio lying between 1.3 and 1.4. In this particular case, this ratio is 1.36. As seen in side elevation, the bottom edges of the two mirrors are spaced by a distance of about 7 inches.

As shown in FIG. 1, in use, the light reflector is oriented so that the wider mirror 11 will face towards the television screen Ca while the narrower mirror 13 will face towards the eyes of the user lying in bed. The television image is inverted from left to right when seen from the wider mirror 11, but the image is reversed to its original position by the narrower mirror 7. The wider mirror is directed towards the television screen for easier television image capture due to its larger field of vision than the narrower mirror.

The light reflector is easily properly oriented by grasping the lamp shade G and properly positioning it with one hand and also, if necessary, by rotating the lamp reflector about the long axis of the lamp shade G (arrow 17) to capture the image from the television screen even if the television apparatus C is located laterally of the foot of the bed. The light reflector 1 need not be removed from the lamp shade G when it is desired to use the lamp in its conventional manner for illuminating the surrounding areas, such as when it is desired to read in bed.

Figure 3:
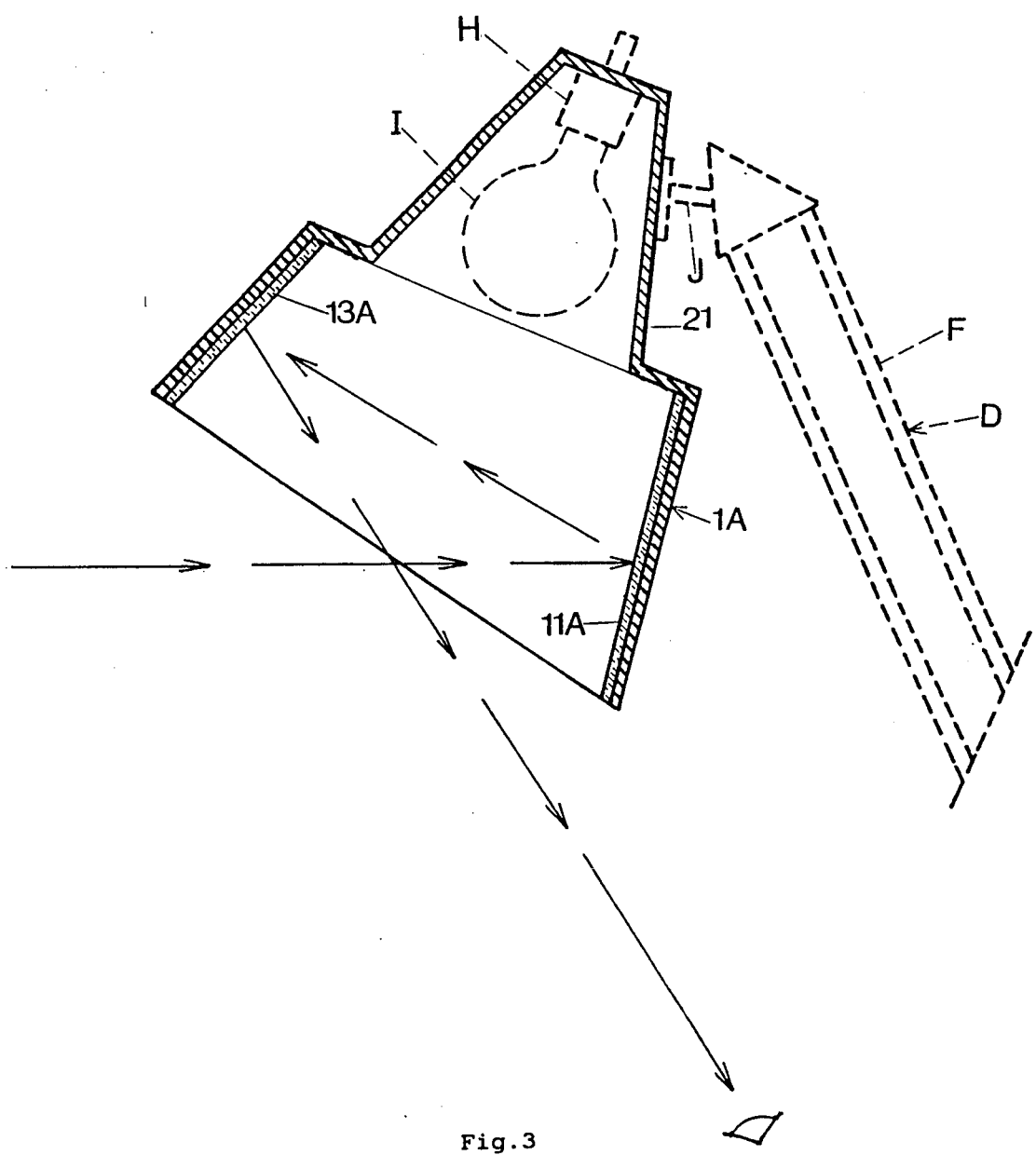
FIG. 3 is a vertical section of a modified embodiment, in which the lamp shade of the lamp and the light reflector form a unitary assembly.

FIG. 3 shows another embodiment in which the light reflector 1A forms an integral part of a lamp shade 21, which is otherwise similar to the lamp shade G and is attached to the arm structure F of the lamp D in the same manner as indicated before. The mirrors 11A and 13A are exactly as in the first embodiment and are supported at the same mutually diverging angle.

Figure 4:
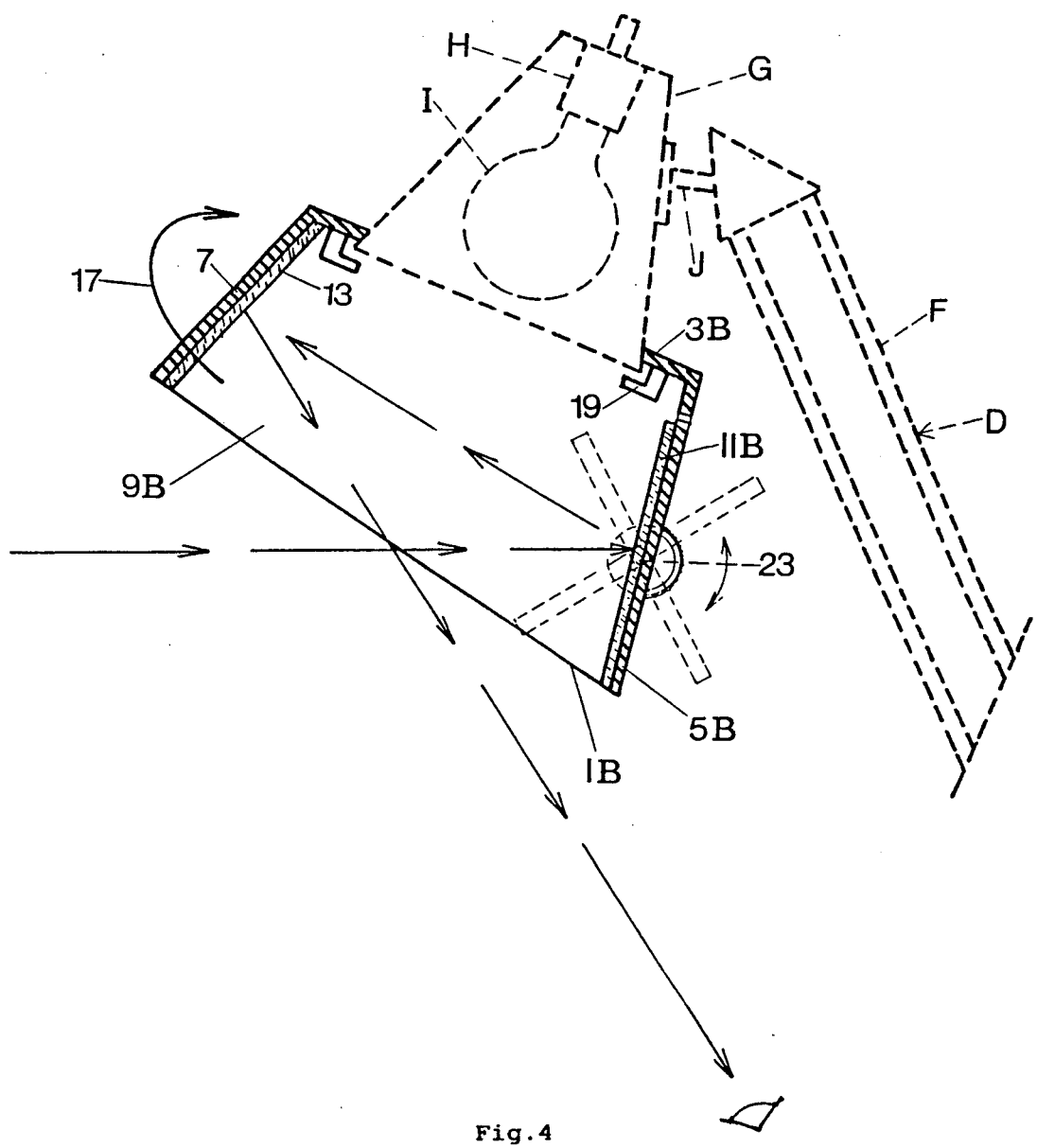
FIG. 4 is a view similar to that of FIG. 2, but of yet another modified embodiment of the light reflector in which one mirror is adjustably pivotable about its longitudinal axis.
Figure 5:
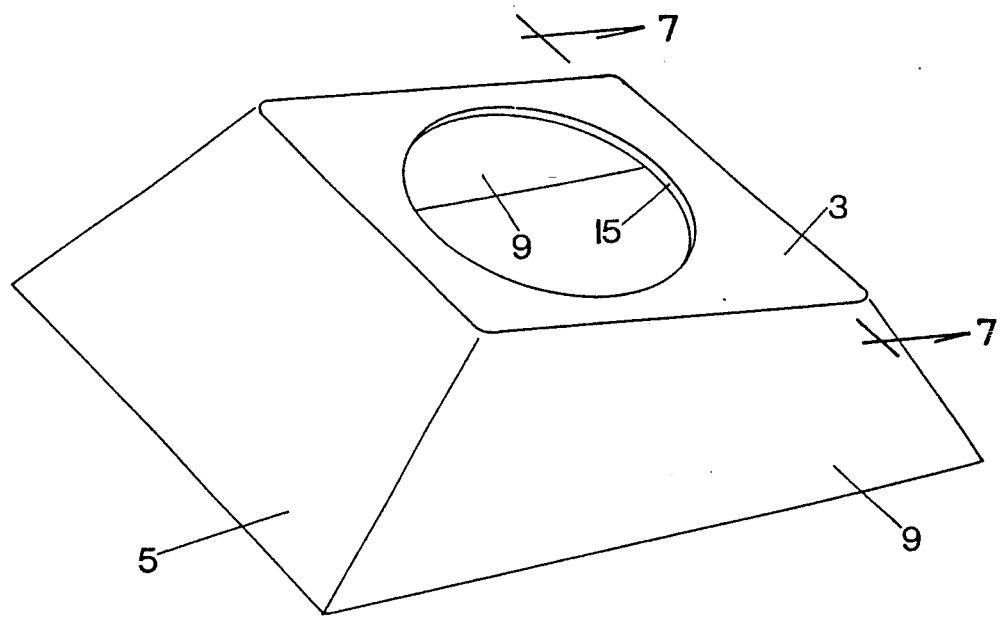
FIG. 5 is a perspective view of the light reflector in accordance with FIG. 2.

FIG. 4 shows another embodiment in which the light reflector 1B is rotatably supported on the lamp shade G, as in the first embodiment, the only difference being that the wider mirror 11 is arranged for angular adjusting in such a manner as to vary the included diverging angle between the two mirrors, this angle being fixed in the first embodiment. More particularly, the wider flat end section 5B, carrying the wider mirror 11B, is arranged for pivoting about a central axis 23 which is normal to the side walls 9B and parallel to the central flat section 3B. A suitable knob, not shown, serves to rotate the mirror to any position, as shown in the dotted line positions, and a locking mechanism locks the mirror in adjusted pivoted position. This arrangement permits a greater latitude in the proper positioning of the viewer components for optimum vision of the television screen.

Figure 6:
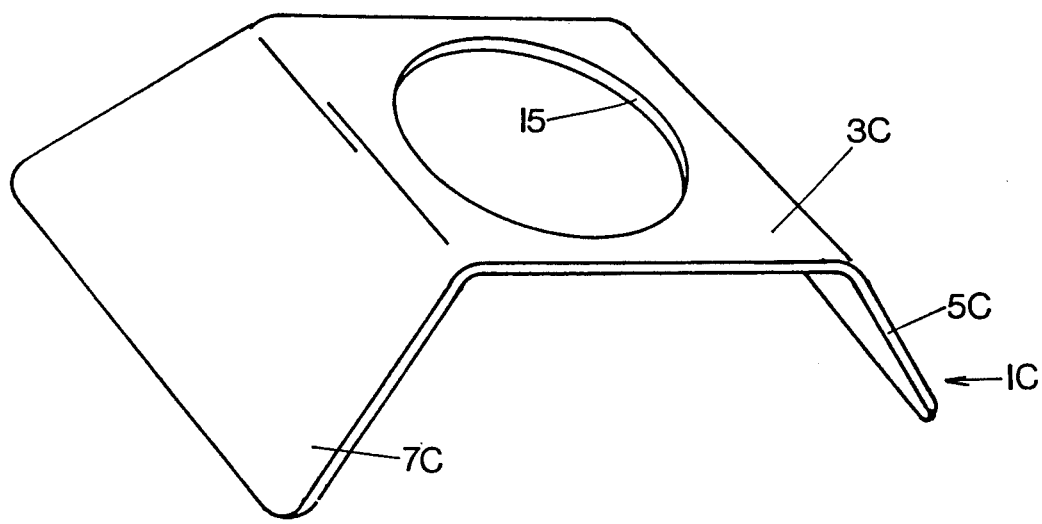
FIG. 6 is a perspective view of still another embodiment of the light reflector.
Figure 7:
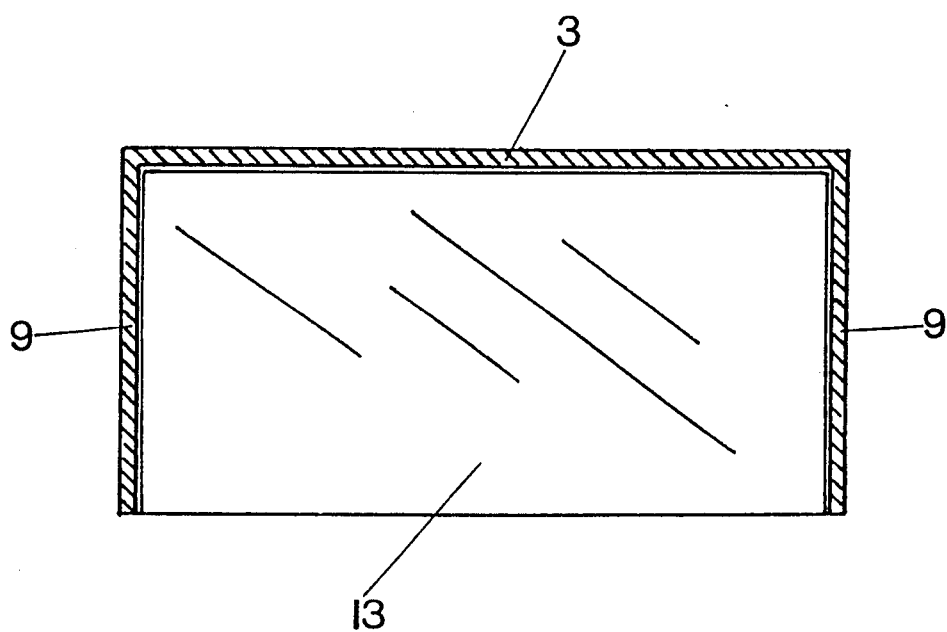
FIG. 7 is a cross-section, taken along line 7—7 of FIG. 5.

FIG. 6 shows still another embodiment of the casing mounting the two mirrors 11 and 13. In this case, the rigid sheet of reflector 1C is devoid of any side walls, such as side walls 9, and is only composed of the central section 3C with hole 15, and of flat end section 5C holding the wider mirror 11 and the narrower flat end section 7C for supporting the narrower mirror 13.

In all embodiments, it is seen that whenever one does not want to watch the television, the lamp can still be used in conventional fashion without having to remove the light reflector 1 1A, 1B or 1C, since the light emitted by the light bulb I will simply pass between the two mirrors and between the side walls 9 when the same are present.

I claim:

1. A light reflector to be used as a bedside television viewer, comprising a frame, a pair of mutually-facing flat mirrors supported by said frame in spaced-apart relationship, said mirrors diverging widthwise of the same by about 30 degrees and substantially parallel to each other longitudinally of the same, and attaching means to attach said frame to a support; wherein said frame forms a rigid sheet assembly including a central flat portion and two end flat portions at an angle of more than 90 degrees relative to said central flat portion, each mirror fixed flat to a corresponding one of said end flat portions.

2. A light reflector as defined in claim 1, wherein both mirrors are generally rectangular and have substantially equal lengths, one mirror having a greater width than the other mirror.

3. A light reflector as defined in claim 2, wherein said one mirror is wider than the other mirror by a ratio lying between 1.3 and 1.4.

4. A light reflector as defined in claim 1, wherein said central fat portion is provided with a hole for receiving a lamp shade, said lamp shade being a portion of said support.

5. A light reflector as defined in claim 4, wherein said sheet assembly further forms side walls fixed to the edges of said central flat portion and of said two end flat portions, whereby said frame defines a casing.

6. In combination with a bedside lamp including a lamp shade, a light bulb socket fixed to and surrounded by said lamp shade, the light reflector of claim 1, said lamp being said support, said lamp shade exposing within the space between the two mirrors a light bulb carried by said socket, the two mirrors diverging in a direction away from said socket.

7. The, combination of claim 6, wherein said attaching means attaches said frame to said lamp shade.

8. The combination of claim 7, wherein said attaching means a low rotation of said frame relative to said lamp shade.

9. The combination as defined in claim 7, wherein said lamp shade and said frame form a unitary assembly.

10. The combination as defined in claim 8, wherein both mirrors are generally rectangular and have substantially equal lengths, one mirror having a greater width than the other mirror.

11. The combination as defined in claim 10, wherein said angle between said end flat portion and said central flat portion has a value of approximately 100 to 110 degrees, each mirror being fixed flat to one of said end portion.

12. The combination as defined in claim 8, wherein said lamp includes a base, means to fix the base to a stationary structure, an arm assembly extending between and pivoted to said base and to said lamp shade, and means to fixedly adjust the position of said arm relative to said base and the position of said lamp shade relative to said arm, so as to adjustably position the lamp shade and light reflector in space.

* * * * *